United States Patent
DeJarnett et al.

(10) Patent No.: US 8,944,127 B1
(45) Date of Patent: Feb. 3, 2015

(54) PORTABLE IMPULSE WELDER

(71) Applicant: Envirocon Systems, Inc., Houston, TX (US)

(72) Inventors: Gregory L. DeJarnett, Houston, TX (US); Mohammed Ali Ahmad, Houston, TX (US)

(73) Assignee: Envirocon Systems, Inc., Houston, TX (US)

( * ) Notice: Subject to any disclaimer, the term of this patent is extended or adjusted under 35 U.S.C. 154(b) by 0 days.

(21) Appl. No.: 14/490,620

(22) Filed: Sep. 18, 2014

(51) Int. Cl.
| | | |
|---|---|---|
| B32B 41/00 | (2006.01) | |
| B29C 65/16 | (2006.01) | |
| B29L 9/00 | (2006.01) | |
| B29K 101/12 | (2006.01) | |
| B29K 105/00 | (2006.01) | |

(52) U.S. Cl.
CPC .............. B29C 65/16 (2013.01); *B29L 2009/00* (2013.01); *B29K 2101/12* (2013.01); *B29K 2105/256* (2013.01)
USPC ........... 156/351; 156/358; 156/359; 156/366; 156/367; 156/368; 156/580; 156/581; 156/583.2

(58) Field of Classification Search
USPC ......... 156/351, 358, 359, 366, 367, 368, 556, 156/580, 581, 583.2
See application file for complete search history.

(56) References Cited

U.S. PATENT DOCUMENTS

| | | | | |
|---|---|---|---|---|
| 4,957,570 A | * | 9/1990 | Jenkins et al. | 156/64 |
| 5,472,549 A | * | 12/1995 | Jurrius et al. | 156/311 |
| 5,843,271 A | * | 12/1998 | Andrew et al. | 156/499 |
| 5,948,190 A | * | 9/1999 | Haug et al. | 156/64 |
| 6,045,640 A | * | 4/2000 | Wermelinger | 156/64 |
| 6,058,998 A | * | 5/2000 | Kristen | 156/359 |
| 6,392,198 B1 | * | 5/2002 | Yao | 219/243 |

* cited by examiner

*Primary Examiner* — George Koch
(74) *Attorney, Agent, or Firm* — Buskop Law Group, PC; Wendy Buskop

(57) ABSTRACT

A portable impulse welding assembly operable by an operator with a main air regulator receiving pressurized air for decreasing or maintaining air pressure to a first preset limit. A splitter simultaneously divides a first regulated air into first and second portions and a rod air regulator provides a first valve air to a first air flow conduit and a second air flow conduit. A pair of pneumatic cylinders mounted in the housing, each pneumatic cylinder having a rod, the pneumatic cylinders selectively receive air from the first air flow conduit to extend each rod from each pneumatic cylinder or receive air from the second air flow conduit causing each rod to retract into each pneumatic cylinder and a controller to control seal times and cool times and a laser pointer to ensure sealing accuracy.

9 Claims, 4 Drawing Sheets

PORTABLE IMPULSE WELDER

FIELD

The present embodiments generally relate a portable movable impulse welder connected to a power source, the welder having a controller to regulate a welding operation the controller adapted to receive inputs for performing the welding operation to create a seamless berm.

BACKGROUND

A need exists for a movable portable impulse welding machines for use to seal two thermoplastic sheets or other polymer sheets together.

A need exists for an impulse welder that enables an operator to input a plurality of welding parameters and use at least two pneumatic powered cylinders to quickly and efficiently control a welding system.

Welding and cutting are essential operations in many different areas of manufacturing and construction in today's economy. The versatility and efficiency of welding and cutting systems is vital to, and allows for, the efficient completion of many complex and dynamic welding operations. In many welding and cutting processes performed by operators, welding-type systems are adjusted during the process to accommodate several different welding-type operations for different types of polymer or plastic sheets. When the need for such adjustments arises, the welding parameters in the welding-type system need to be properly set for each different welding-type process.

The present invention ensures better parameter setting and removes operator error from the welding process.

A need exists for a single operator to install plastic sheets and weld with a portable unit to create seamless spill containment berms.

The present embodiments meet these needs.

BRIEF DESCRIPTION OF THE DRAWINGS

The detailed description will be better understood in conjunction with the accompanying drawings as follows.

Figure 1:
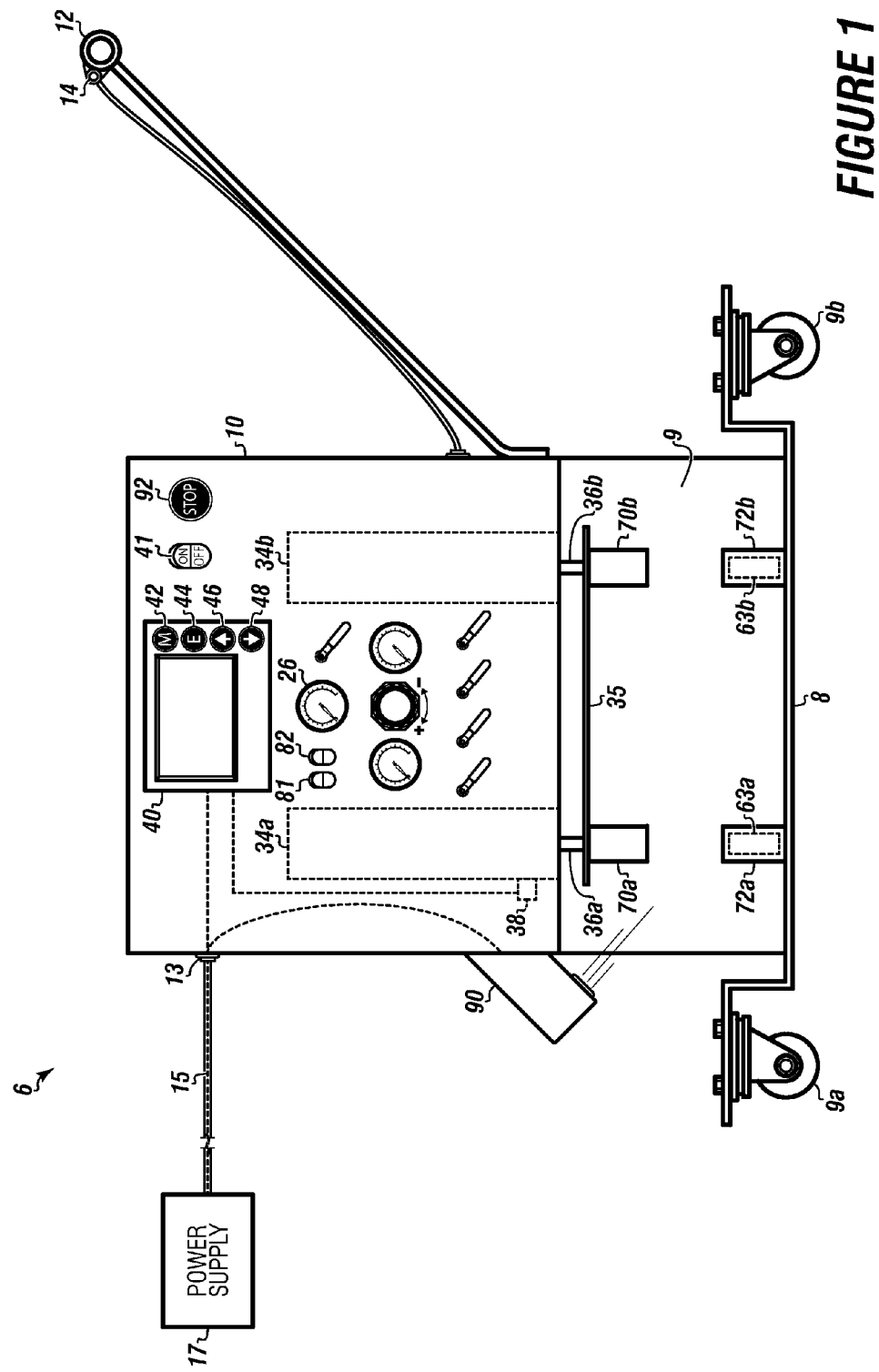
FIG. 1 depicts a portable impulse welding assembly.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate a portable movable impulse welder, the welder having a controller to regulate a welding operation. The controller can be adapted to receive inputs for performing the welding operation to create a seamless berm.

A benefit of the invention is that it prevents burns to operators needing to weld thermoplastic sheeting to make berms.

A benefit of the invention is that fewer knife cuts are needed when this invention is used to make berms from thermoplastic sheeting.

Still another benefit of the invention is that the assembly allows workers to use fewer pieces of equipment, without the need to lift heavy equipment, preventing back injuries and broken bones.

A benefit of the invention is that the assembly requires less electricity to weld the same kind of berms than used with traditional welding equipment which can use 10 times the amount of energy.

A benefit of the invention is that no seams are created with the final product, so that toxic spills are more fully contained by the berms.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "berm" as used herein refers to a thermoplastic construction made to contain spills, such as hazardous chemical spills or spills from equipment which leak oil, hydraulic fluid, contaminated water or other contaminated liquids, bases or acids.

In embodiments, two sheets of berm material can be welded together. In embodiments, the berm material can be from 10 mils to 120 mils in thickness.

The invention has the ability to create a 3 inch to 18 inch weld very quickly.

The invention can form a weld in 4 seconds to 10 seconds, and have a short cool time, such as from 15 seconds to 20 seconds.

The invention relates to a portable impulse welding assembly operable by a single operator, having a movable base and a housing mounted over the base.

Power and air can be passed into the housing.

Air can first pass to a main air regulator for decreasing or maintaining air pressure to a first preset limit. The air from the main air regulator can then be flowed to a splitter for simultaneously dividing the air from the main air regulator into first and second portions. A portion of the split air can be passed to a rod air regulator.

In embodiments, a first valve, such as a three way valve, can receive the first portion of air and transfer the air to a four way valve.

The four way valve can alternatingly flow air to a first air flow conduit and a second air flow conduit. The four way valve can either flow air to extend or retract rods in at least a pair of pneumatic cylinders. In an embodiment, the four way valve can have an exhaust stream to release back pressure when the rod moves.

Electrically, the portable impulse welding assembly can have a power transformer, a current transformer and a temperature measuring device for heating and regulating electricity to an upper heater portion mounted to a top frame and a lower heater portion mounted to the base. A controller can be used to control seal times and cool times. A laser pointer can be used to ensure the operator provides proper weld alignment.

Turning now to the Figures, FIG. 1 depicts a portable impulse welding assembly 6.

The portable impulse welding assembly 6 can be movable, relocatable and light-weight, and can be operable by a single operator.

The portable impulse welding assembly 6 can include a base 8 having a back side 9. A housing 10 can be mounted to the back side 9. The housing can have a front side, back side, top, and bottom. The housing can have two side walls between the front and back sides, each opposite the other between the top and bottom. The base can be a movable base.

A power inlet 13 can be formed in the housing for receiving power 15 from a power supply 17. The power supply 17 can be 120 volts to 240 volts, such as power from a generator, a wind farm, hydroelectric power, such as from a high power bank of fuel cells, or from a grid.

The housing 10 can have an on/off switch 41 connected to the power inlet 13. The on/off switch can be a toggle switch or a button.

The portable impulse welding assembly 6 can include a position sensor 38 in the housing 10 mounted proximate to a rod 36a on a pneumatic cylinder 34a mounted in the housing. The position sensor 38 can be connected to a controller 40 mounted in the housing. In embodiments, a plurality of pneumatic cylinders 34a and 34b can be used. Each pneumatic cylinder can have a rod 36a and 36b mounted to a movable top frame 35.

The portable impulse welding assembly 6 can include upper heater portions 70a and 70b mounted to the movable top frame 35. The upper heater portions can be aluminum or another heat resistant material, such as a high temperature resistant non-deforming plastic. In embodiments, the upper heater portions can be made from a material that does not hold heat very long. The upper heater portions can be made from 100 percent of a single material, or can be a laminate or a composite.

In embodiments, the upper heater portions can be from 0.5 inches to 1 foot in length and from 0.25 inches to 2 inches in width. In embodiments the upper heater portions can be fastened to the movable top frame with plastic spring loaded fasteners.

The portable impulse welding assembly 6 can include lower heater portions 72a and 72b mounted to the base 8. In embodiments, the lower heater portions can be identical to the upper heater portions. In other embodiments, the upper heater portions can be made of a first material and the lower heater portions can be made of a second material to reduce weight or cost.

The portable impulse welding assembly 6 can include a first contact 63a and a second contact 63b that connect to a temperature measuring device. In embodiments, the temperature measuring device can be a thermocouple and the first and second contacts can be copper wire contacts. In embodiments, the first and second contacts can engage either the upper heater portions or lower heater portions.

The upper heater portions and lower heater portions can also connect to a power transformer which can also be mounted in the housing.

The base 8 can be mounted on wheels 9a and 9b. Four wheels or casters can be used in embodiments. In embodiments, the casters can rotate 360 degrees for easy movement of the portable impulse welding assembly.

The portable impulse welding assembly 6 can include a rod air regulator display 26, which can be a gauge, for displaying pressure from the rod air regulator on the front of the housing. The rod air regulator display can show pressure of the air from 0.001 psi to 100 psi.

The portable impulse welding assembly 6 can include a handle 12 extending from the housing 10 for ease of movement of the portable impulse welding assembly on a surface. The handle can support a remote actuation device 14, which can be a push button mounted to the handle for an operator to initialize the air pressure to the pneumatic cylinders.

Initialization of air pressure in the pneumatic cylinders can occur when computer instructions in the data storage instruct the processor to flow air from the main regulator to the splitter when a signal from the remote actuation device is received by the processor.

The portable impulse welding assembly 6 can include a laser pointer 90 mounted to the housing 10 to indicate a location to insert at least two layers of thin flexible thermoplastic sheet for sealing by an extension of the upper heater portion to the lower heater portion using the movable top frame 35 and rods 36a and 36b.

The laser pointer 90 can be connected to the power inlet 13. The laser pointer can be a low voltage non-cutting non-burning laser beam such those used to explain power point presentations.

The portable impulse welding assembly 6 can include an emergency stop 92 for cutting off power 15 to the portable impulse welding assembly 6.

The controller 40 can have a display with a menu button 42, an enter button 44, an up button 46 and a down button 48. The menu button 42 can be used for presenting a menu set up on the controller. The menu button can communicate with computer instructions in the data storage that allow an operator to insert a seal time and a cool time into the data storage. The enter button 44 can be used to store seal times, cool times, and other data input by the operator using the controller. The up button 46 can increase values displayed in the menu set up. The down button 48 can decrease values displayed in the menu set up. Examples of a usable controller can be a ROPEX™ from Germany.

In embodiments, the housing 10 can support a pair of fuses 81 and 82; one fuse can be connected to each incoming power line.

Figure 2:
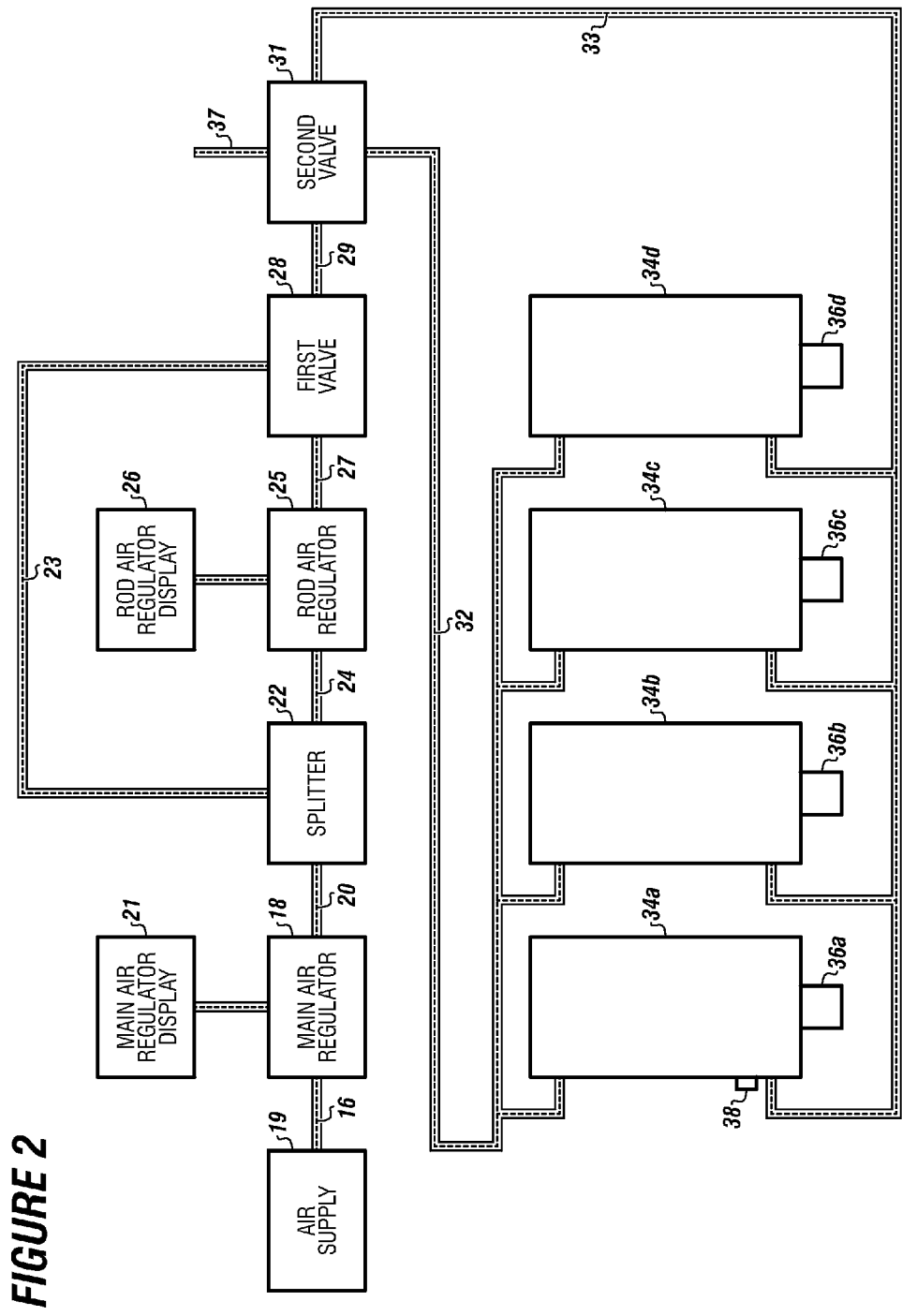
FIG. 2 depicts a diagram of the air flow usable in the portable impulse welding assembly.

FIG. 2 depicts a diagram of the air flow usable in the portable impulse welding assembly.

A main air regulator 18 mounted in the housing can receive pressurized air 16 from an air supply 19. The pressurized air 16 can be from 0.001 psi to 200 psi. The air supply 19 can be provided from a compressor or pressurized tanks, which can be movable or fixed in embodiments. The main air regulator 18 can be used for decreasing or maintaining air pressure to a first preset limit which has been set by an operator. The main air regulator can form a first regulated air 20. An example of the first preset limit set by the operator can be 20 psi.

A main air regulator display 21, which can be a gauge, can display pressure passing through the main air regulator. Examples of main air regulators can be a PARKER VALVE™ or a SWAGELOCK™.

The first regulated air 20 can be emitted from the main air regulator 18 and transferred to a splitter 22. The splitter 22 in the housing can simultaneously divide the first regulated air 20 into a first portion of air 23 and a second portion of air 24. The pressure of the first and second portions of air can be identical pressures.

A rod air regulator 25 in the housing can receive the second portion 24 of air from the splitter 22. A rod air regulator display 26, which can be a gauge, can display pressure from the rod air regulator.

A first valve 28 in the housing can receive the first portion of air 23 from the splitter 22 and a second regulated air 27 from the rod air regulator 25. The first valve 28 can be a three way valve. The first valve can be an actuator valve that moves up and down.

A second valve 31 mounted in the housing can controllably receive the first valve air 29 from the first valve 28 and pass the first valve air either to a first air flow conduit 32 or a second air flow conduit 33. The second valve 31 can be a four way valve and can have an exhaust 37.

Two pairs of pneumatic cylinders can be mounted in the housing. Each pneumatic cylinder 34a-34d can have a rod 36a-36d respectively. The pneumatic cylinders can be connected in parallel. The pneumatic cylinders can selectively receive air from the first air flow conduit 32 to extend each rod from each pneumatic cylinder simultaneously, or receive air from the second air flow conduit 33 causing each rod to retract into each pneumatic cylinder simultaneously. The position sensor 38 can be attached to a pneumatic cylinder, such as pneumatic cylinder 34a.

Figure 3:
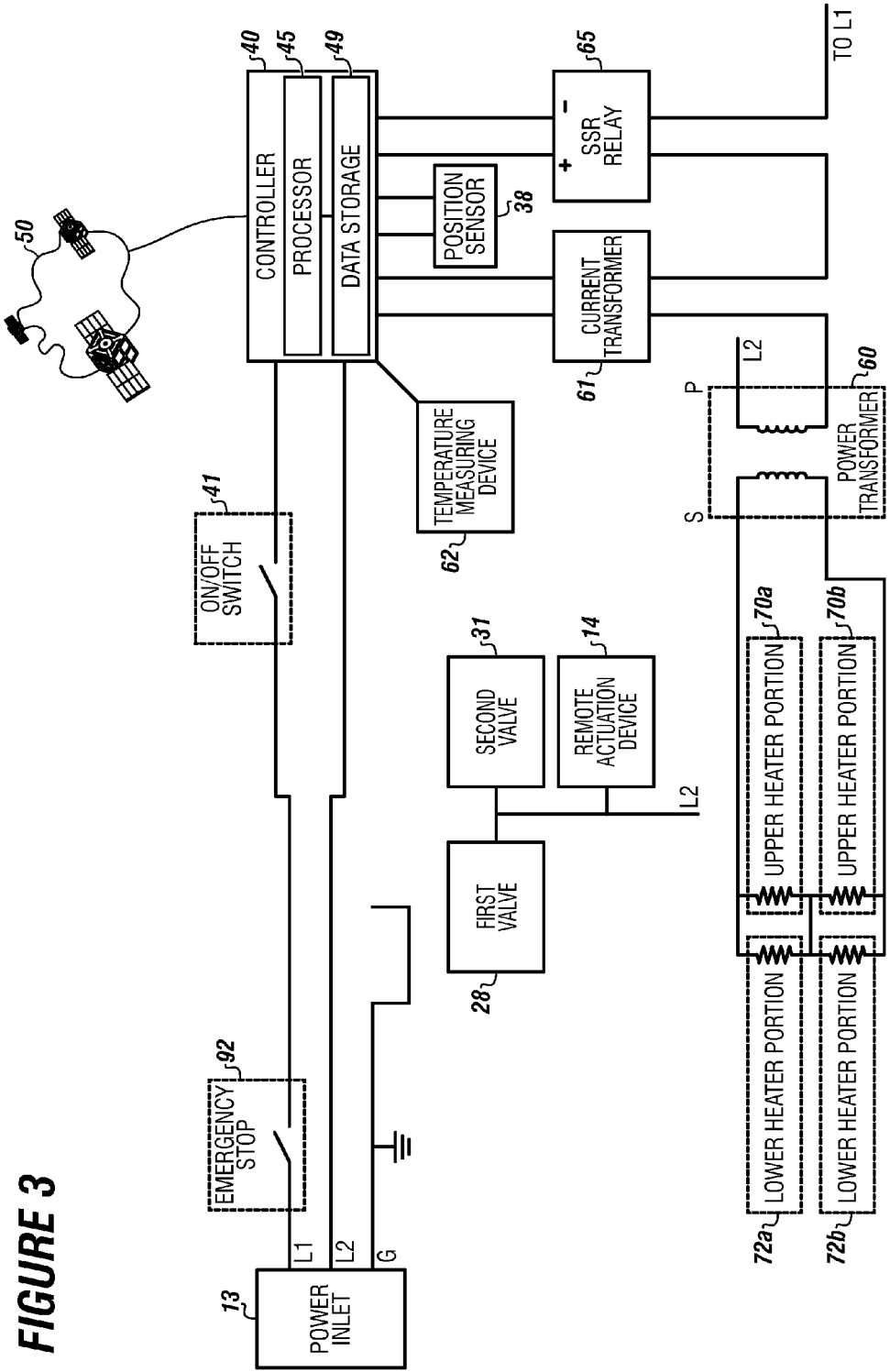
FIG. 3 depicts a diagram of the electrical path usable in the portable impulse welding assembly.

FIG. 3 depicts a diagram of the electrical path usable in the portable impulse welding assembly.

Power can enter through power inlet 13 and pass through the emergency stop 92 before connecting to the on/off switch 41.

The controller 40 can be connected to the on/off switch 41, a power transformer 60, a current transformer 61, a temperature measuring device 62, and the position sensor 38. The controller can have a processor 45 connected to a data storage 49 and a network 50. The processor 45 can be a computer or a programmable logic controller. In embodiments, a removable smart phone can be used as the controller. The network 50 can be the internet, a local area network, a satellite network, a cellular network, a similar, or combinations thereof.

The power transformer 60 in the housing can convert power to increase or decrease amperage from power entering through the power inlet 13. An example of usable power transformers can be any known in the industry, such as from Jacobs Electronics. The power transformer 60 can transfer electricity to the upper heater portions 70a and 70b and lower heater portions 72a and 72b simultaneously.

The current transformer 61 in the housing can convert power entering through the power inlet 13 to increase or decrease volts. An example of a usable current transformer can be a ROPEX™ made by Toss Machine Components, Inc.

The temperature measuring device 62 in the housing can be two pieces of wire that sense current resistance for the controller to monitor. The temperature measuring device can include the first contact and second contact shown in FIG. 1.

The first valve 28, can be a three way valve, and second valve 31, can be a four way valve, can be actuated by the remote actuation device 14.

An SSR relay 65 can connect to the controller 40 and the power inlet 13 to boost power to the power transformer 60.

Figure 4:
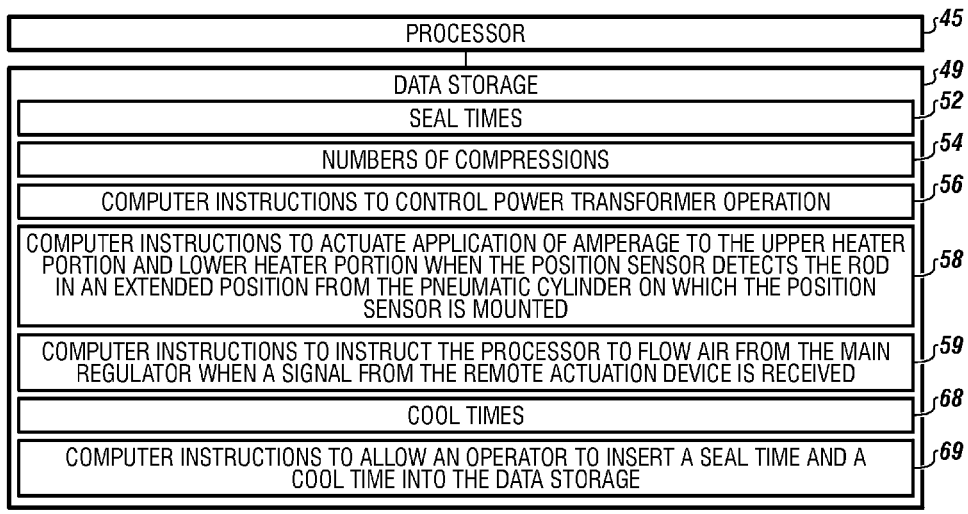
FIG. 4 depicts the processor and data storage usable with the portable impulse welding assembly.

FIG. 4 depicts the processor and data storage usable with the portable impulse welding assembly.

The processor 45 can be connected to the data storage 49.

The data storage 49 can include seal times 52 representing a length of time the upper heater portion make contact with the lower heater portion.

The data storage 49 can include stored numbers of compressions 54. The numbers of compressions represent the number of times the upper heater portion contacts the lower heater portion.

The data storage 49 can include computer instructions 56 to control power transformer operation.

The data storage 49 can include computer instructions 58 to actuate application of amperage to the upper heater portion and lower heater portion when the position sensor detects the rod in an extended position from the pneumatic cylinder on which the position sensor is mounted.

The data storage 49 can include computer instructions 59 to instruct the processor to flow air from the main regulator when a signal from the remote actuation device is received.

The data storage 49 can include cool times 68 for the formed seal after the upper heater portion has moved towards the lower heater portion applying heat to the thermoplastic sheet positioned between the heater portions.

The data storage 49 can include computer instructions 69 to allow an operator to insert a seal time and insert a cool time into the data storage.

In embodiments, the portable impulse welding assembly can have a weight of only 130 pounds to 160 pounds, and can be operated by a single individual easily and effectively. In embodiments, the portable impulse welding assembly can be plugged into conventional single phase power for ease of operation.

In embodiments, the housing of the portable impulse welding assembly can have a width from 5 inches to 15 inches, a height from 5 inches to 20 inches, and a length from 15 inches to 32 inches. In embodiments, the base of the portable impulse welding assembly can have a flat central portion and integral raised edges. The flat central portion can have a length and width that are identical to the housing.

The base can have a thickness of 0.25 inches to 2 inches. In embodiments, each edge of the base can extend beyond the housing, such as from 2 inches to 6 inches, depending on the type of berm needing to be welded. Each edge can support a guide roller in embodiments.

The housing and base of the portable impulse welding assembly can be made from powder coated steel. In embodiments, the base can be made from one material and the housing can be made from another. The base can be resistant to temperatures up to 400 degrees Fahrenheit.

The top frame can be made from 1018 steel or a similar non-deforming material, while the housing can be made from plastic.

In embodiments, the handle of the portable impulse welding assembly can extend from the housing allowing the operator to push the base along a surface. The handle can be made from steel, polyvinyl chloride, or another extremely rigid plastic or steel. The handle can support the remote actuation device which initializes the air pressure into the pneumatic cylinders in the housing.

To operate the portable impulse welding assembly, first an operator turns the on/off switch to an "on" position allowing power to flow into the housing.

The operator then sets a seal time on the controller to be applied when contact is made between the upper heater portion and the lower heater portion. The operator then sets a pressure for the rod air regulator which can be adjusted depending on the type of material to be sealed.

Berm material is then aligned over the lower heater portion using the laser pointer. The operator then actuates the remote actuation device mounted to the housing or to a handle attached to the housing to initialize the air pressure into at least a pair of pneumatic cylinders in the housing. With the actuation of the remote actuation device, computer instructions in the data storage instruct the processor to flow air from the main regulator to a splitter.

A first valve flows air to a second valve which transfers air to a first air flow conduit to extend the rods from the pair of pneumatic cylinders. The rods extend jointly and simultaneously move a top frame with upper heater portions mounted thereto towards the bottom heater portions mounted on the base.

When a position sensor mounted on one of the pneumatic cylinders detects the rod of that cylinder as extended, the controller causes a second valve to reduce pressure in the cylinders or welding two layers of thermoplastic together, while simultaneously initializing current to the power transformer immediately causing the upper heater portion and lower heater portions to receive very low voltage and very high current forming a seal between the two layers of berm material.

The upper and lower heater portions stay in contact until the seal time input by the operator expires and the cool time input by the operator expires. There are no current adjustments needed or permitted by an operator. The process requires no special training for the operator.

After the cool time expires, the second valve changes the air supply from the first air flow conduit to the second air flow conduit, causing the rods of the pneumatic cylinders to retract back into the pneumatic cylinders Calibrations can be performed on the controller to ensure reliability and functioning to specifications.

To perform a calibration, the menu button is depressed to reach an auto-calibration selection. Upon actuation of the auto-calibration, the machine automatically calibrates itself, preventing operators from making improper welds.

While these embodiments have been described, it should be understood that within the scope of the appended claims, the embodiments might be practiced other than as specifically described herein.

What is claimed is:

1. A portable impulse welding assembly operable by an operator, comprising:
   a. a base having a back side;
   b. a housing mounted to the back side of the base;
   c. a power inlet formed in the housing for receiving power from a power supply;
   d. an on/off switch connected to the power inlet;
   e. a main air regulator in the housing for receiving pressurized air from an air supply, the main air regulator for decreasing or maintaining air pressure to a first preset limit forming a first regulated air;
   f. a splitter in the housing for simultaneously dividing the first regulated air into a first portion of air and a second portion of air;
   g. a rod air regulator in the housing for receiving the second portion of air from the splitter;
   h. a first valve in the housing for receiving the first portion of air from the splitter and a second regulated air from the rod air regulator;
   i. a second valve mounted in the housing for controllably providing a first valve air from the first valve to a first air flow conduit and a second air flow conduit;
   j. at least a pair of pneumatic cylinders mounted in the housing, each pneumatic cylinder having a rod, the pneumatic cylinders connected in parallel, the pneumatic cylinders selectively receiving air from the first air flow conduit to extend each rod from each pneumatic cylinder simultaneously or receiving air from the second air flow conduit causing each rod to retract into each pneumatic cylinder simultaneously;
   k. a position sensor in the housing mounted on one of the pneumatic cylinders proximate to the rod of that pneumatic cylinder;
   l. a power transformer in the housing for converting power, to increase or decrease amperage;
   m. a current transformer in the housing for converting power, to increase or decrease volts;
   n. a temperature measuring device in the housing having a first contact and a second contact;
   o. a movable top frame mounted to each of the rods extending from the pneumatic cylinders;
   p. an upper heater portion mounted to the movable top frame and a lower heater portion mounted to the base, with the upper heater portion and the lower heater portion connected to the power transformer, either the upper heater portion or the lower heater portion is connected with the first contact and the second contact of the temperature measuring device;
   q. a controller connected to the on/off switch, the power transformer, the current transformer, the temperature measuring device, and the position sensor, the controller having a processor connected to a data storage and a network; the controller adapted to store in the data storage:
      (i) seal times representing a length of time the upper heater portion makes contact with the lower heater portion;
      (ii) computer instructions to control power transformer operation within preset limits; and
      (iii) computer instructions to actuate application of amperage to the upper heater portion and the lower heater portion when the position sensor detects the rod in an extended position from the pneumatic cylinder; and
   r. a laser pointer mounted to the housing to indicate a location to insert at least two layers of thin flexible thermoplastic sheets for sealing between the upper heater portion with the lower heater portion.

2. The portable impulse welding assembly of claim 1, comprising a handle extending from the housing for ease of movement of the portable impulse welding assembly on a surface.

3. The portable impulse welding assembly of claim 2, comprising a remote actuation device mounted to the handle for the operator to initialize the pressurized air to the pneumatic cylinders and computer instructions in the data storage to instruct the processor to flow air from the main regulator when a signal from the remote actuation device is received by the processor.

4. The portable impulse welding assembly of claim 1, wherein the base is on four wheels.

5. The portable impulse welding assembly of claim 1, wherein the main air regulator has a main air regulator display for displaying a pressure of air flowing through the main air regulator.

6. The portable impulse welding assembly of claim 1, wherein the rod air regulator has a rod air regulator display for displaying pressure of air flowing through the rod air regulator.

7. The portable impulse welding assembly of claim 1, wherein the data storage comprises stored numbers of compressions between the upper heater portion and the lower heater portions.

8. The portable impulse welding assembly of claim 1, comprising an emergency stop for cutting off power to the portable impulse welding assembly.

9. The portable impulse welding assembly of claim 1, comprising a menu button on the controller for presenting a menu set up, the menu button communicating with computer instructions that allow the operator to insert a seal time and insert a cool time into the data storage for use by the processor.

* * * * *